US011443184B2

(12) United States Patent
McGill et al.

(10) Patent No.: US 11,443,184 B2
(45) Date of Patent: Sep. 13, 2022

(54) METHODS AND SYSTEMS FOR PREDICTING A TRAJECTORY OF A ROAD AGENT BASED ON AN INTERMEDIATE SPACE

(71) Applicant: Toyota Research Institute, Inc., Los Altos, CA (US)

(72) Inventors: Stephen G. McGill, Broomall, PA (US); Guy Rosman, Newton, PA (US); Luke S. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 603 days.

(21) Appl. No.: 16/544,129

(22) Filed: Aug. 19, 2019

(65) Prior Publication Data

US 2021/0056402 A1 Feb. 25, 2021

(51) Int. Cl.
*G06N 3/08* (2006.01)
*G05D 1/02* (2020.01)
(Continued)

(52) U.S. Cl.
CPC ............ *G06N 3/08* (2013.01); *G05D 1/0088* (2013.01); *G05D 1/0221* (2013.01); *G06N 3/04* (2013.01)

(58) Field of Classification Search
CPC ........ G06N 3/08; G06N 3/0454; G06N 3/088; G06N 20/00; G05D 1/0088; G05D 1/0221; B06N 3/04; G01C 21/3407
See application file for complete search history.

(56) References Cited

U.S. PATENT DOCUMENTS

| | | | |
|---|---|---|---|
| 9,747,805 B2 | 8/2017 | Deshpande et al. | |
| 2015/0039217 A1* | 2/2015 | Deshpande | G08G 1/20 701/300 |

FOREIGN PATENT DOCUMENTS

| | | |
|---|---|---|
| CN | 103246706 A | 8/2013 |
| CN | 104657746 B | 9/2017 |

(Continued)

OTHER PUBLICATIONS

Damerow, Florian et al., "Spatio-temporal trajectory similarity and its application to predicting lack of interaction in traffic situations", 2016 IEEE 19th International Conference on Intelligent Transportation Systems (ITSC), Nov. 2016, p. 2512-2519.

(Continued)

*Primary Examiner* — Marthe Y Marc-Coleman
(74) *Attorney, Agent, or Firm* — Dinsmore & Shohl LLP

(57) ABSTRACT

An embodiment takes the form of a prediction system that obtains a respective indicated similarity of trajectories in each of a plurality of combinations of observed vehicle trajectories. The prediction system, for each of the combinations, calculates a distance between respective intermediate representations, generated by a neural network, of the trajectories in the combination, and performs a training of the neural network based on a calculated loss between the distance and the indicated similarity of the trajectories in the combination. The respective calculated losses converge after performing respective trainings for the combinations. The prediction system creates an intermediate space of respective intermediate representations, generated by the neural network, of observed vehicle trajectories, and predicts a trajectory of a road agent based on a distance between a given intermediate representation in the intermediate space and an intermediate representation of an observed trajectory of the road agent generated by the neural network.

20 Claims, 11 Drawing Sheets

(51) Int. Cl.
  *G05D 1/00*   (2006.01)
  *G06N 3/04*   (2006.01)

(56) References Cited

FOREIGN PATENT DOCUMENTS

| | | |
|---|---|---|
| CN | 104504897 B | 10/2017 |
| CN | 107766406 A | 3/2018 |
| DE | 102008061910 A1 | 9/2009 |
| KR | 100923723 B1 | 10/2009 |

OTHER PUBLICATIONS

Houenou, Adam et al., "Vehicle trajectory prediction based on motion model and maneuver recognition", 2013 IEEE/RSJ International Conference on Intelligent Robots and Systems (IROS 2013), Nov. 2013, p. 4363-4369.

\* cited by examiner

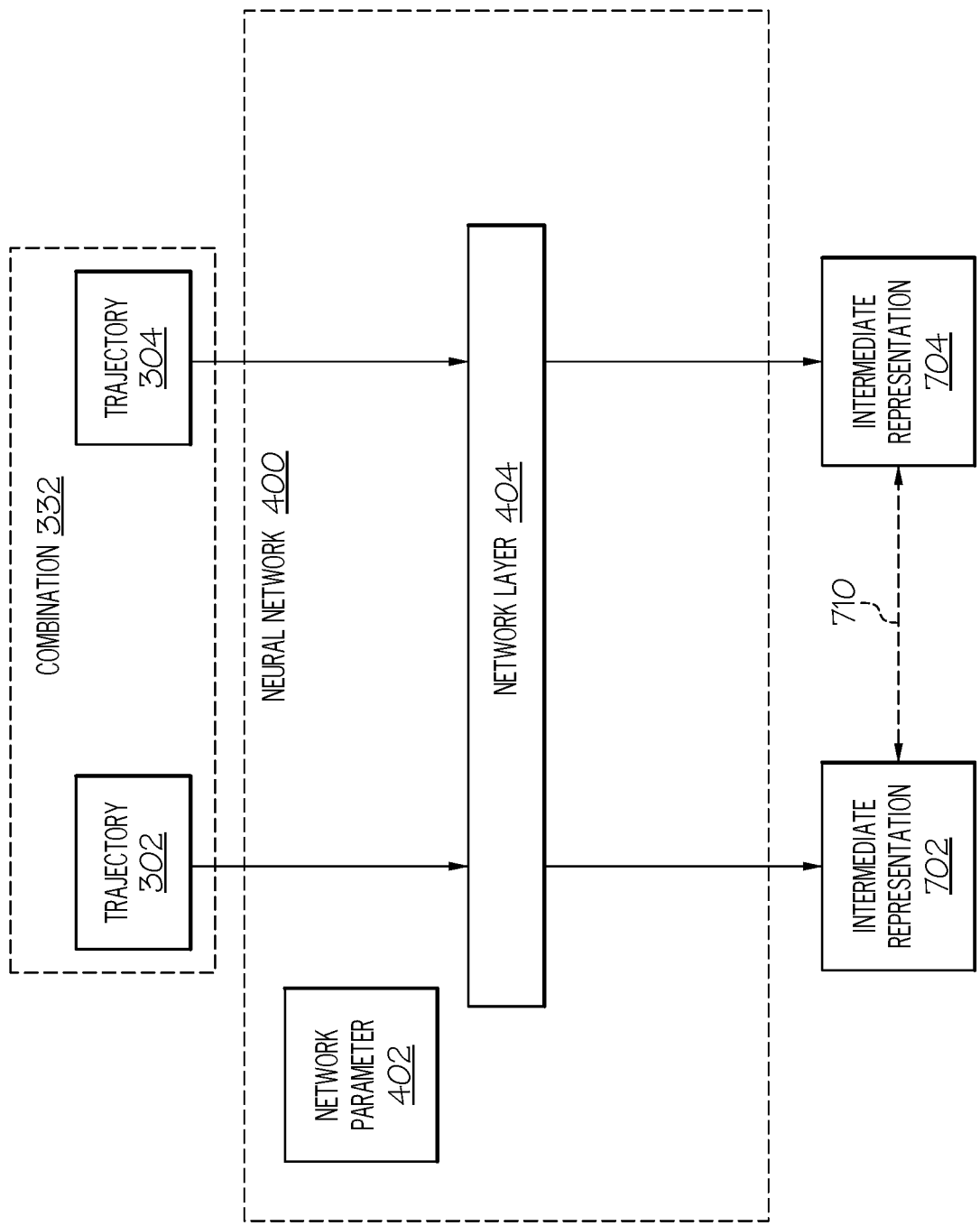

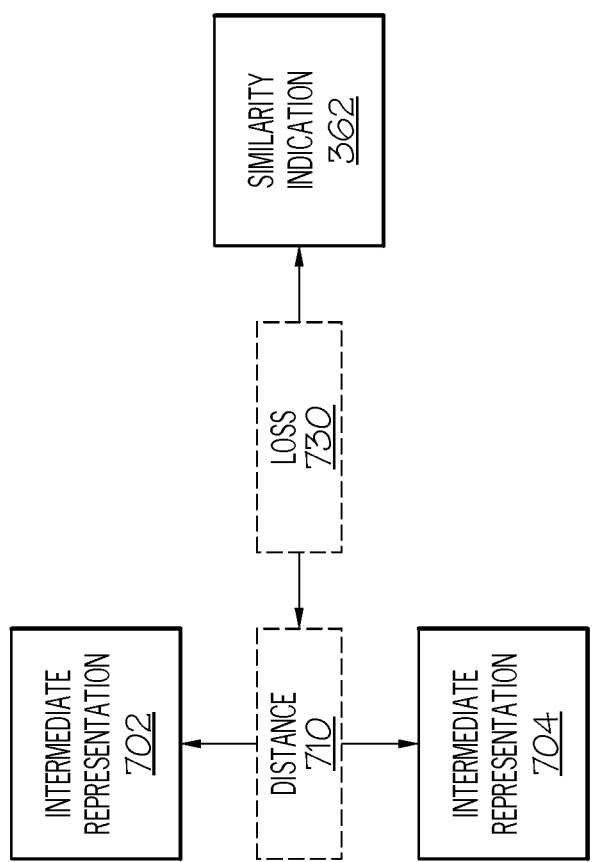

METHODS AND SYSTEMS FOR PREDICTING A TRAJECTORY OF A ROAD AGENT BASED ON AN INTERMEDIATE SPACE

TECHNICAL FIELD

The present disclosure generally relates to a prediction system, computing devices, and methods carried out the systems and devices, and more specifically, to systems, devices, and methods for predicting a trajectory of a road agent based on an intermediate space.

BACKGROUND

Vehicles (such as autonomous and semi-autonomous vehicles) are often equipped with a driver-assistance system, which may be able to aid a driver of a vehicle by providing functions such as adaptive cruise control, lane departure warnings, lane centering, and collision avoidance. These features may operate to prevent collisions with road agents such as other vehicles, bicyclists, or other entities that may be sharing a road with the vehicle. In some cases, operation of these features may depend on a trajectory of a given road agent.

SUMMARY

An embodiment of the present disclosure takes the form of a method carried out by a prediction system. The method includes the prediction system obtaining a respective indicated similarity of trajectories in each of a plurality of combinations of observed vehicle trajectories. The method further includes the prediction system, for each of the combinations, calculating a distance between respective intermediate representations, generated by a neural network, of the trajectories in the combination, and performing a training of the neural network based on a calculated loss between the calculated distance and the indicated similarity of the trajectories in the combination. The respective calculated losses converge after performing respective trainings for the combinations. The method further includes the prediction system creating an intermediate space of respective intermediate representations, generated by the neural network after performing the respective trainings for the combinations, of observed vehicle trajectories, and also includes predicting a trajectory of a road agent based on a distance between a given intermediate representation in the intermediate space and an intermediate representation of an observed trajectory of the road agent generated by the neural network.

Another embodiment takes the form of a computing device that includes a processor and a non-transitory computer-readable storage medium having instructions that, when executed by the processor, cause the computing device to obtain a respective indicated similarity of trajectories in each of a plurality of combinations of observed vehicle trajectories. The instructions further cause the computing device to, for each of the combinations, calculate a distance between respective intermediate representations, generated by a neural network, of the trajectories in the combination, and perform a training of the neural network based on a calculated loss between the calculated distance and the indicated similarity of the trajectories in the combination. The respective calculated losses converge after performing respective trainings for the combinations. The instructions also cause the computing device to create an intermediate space of respective intermediate representations, generated by the neural network after performing the respective trainings for the combinations, of observed vehicle trajectories. Additionally, the instructions cause the computing device to predict a trajectory of a road agent based on a distance between a given intermediate representation in the intermediate space and an intermediate representation of an observed trajectory of the road agent generated by the neural network.

A further embodiment takes the form of a computing device that includes a processor and a non-transitory computer-readable storage medium having instructions that, when executed by the processor, cause the computing device to predict a trajectory of a road agent based on a distance between a given intermediate representation in an intermediate space and an intermediate representation of an observed trajectory of the road agent generated by a neural network. The intermediate space includes respective intermediate representations, of observed vehicle trajectories, generated by a neural network after performing respective trainings of the neural network for each of a plurality of combinations of observed vehicle trajectories. The respective trainings include, for each of the combinations, a calculated a distance between respective intermediate representations, generated by the neural network, for the trajectories in the combination, and a training of the neural network based on a calculated loss between the calculated distance and an indicated similarity of the trajectories in the combination, such that respective calculated losses converge after respective trainings for the combinations.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7A depicts a calculated distance between intermediate representations, according to one or more embodiments described and illustrated herein;

FIG. 7B depicts a calculated loss, according to one or more embodiments described and illustrated herein.

DETAILED DESCRIPTION

Prediction systems, computing devices, and methods for predicting a trajectory of a road agent based on an intermediate space are disclosed herein. In some embodiments, a prediction system obtains a respective indicated similarity of trajectories in each of a plurality of combinations of observed vehicle trajectories. The prediction system, for each of the combinations, calculates a distance between respective intermediate representations, generated by a neural network, of the trajectories in the combination, and performs a training of the neural network based on a calculated loss between the calculated distance and the indicated similarity of the trajectories in the combination. The respective calculated losses converge after performing respective trainings for the combinations. The prediction system creates an intermediate space of respective intermediate representations, generated by the neural network after performing the respective trainings for the combinations, of observed vehicle trajectories, and also predicts a trajectory of a road agent based on a distance between a given intermediate representation in the intermediate space and an intermediate representation of an observed trajectory of the road agent generated by the neural network. By predicting the trajectory of the road agent based on the distance between the given intermediate representation in the intermediate space and the intermediate representation of the observed trajectory of the road agent, the neural network may not need to be retrained in order for the prediction system to predict a trajectory of a road agent if an indicated classification of a given trajectory for an intermediate representation includes a given classification from among a set of defined classifications, even if that set of defined classifications is later changed. Various embodiments of prediction systems, computing devices, and methods for predicting a trajectory of a road agent based on an intermediate space will now be described in detail with reference to the drawings.

Figure 1:
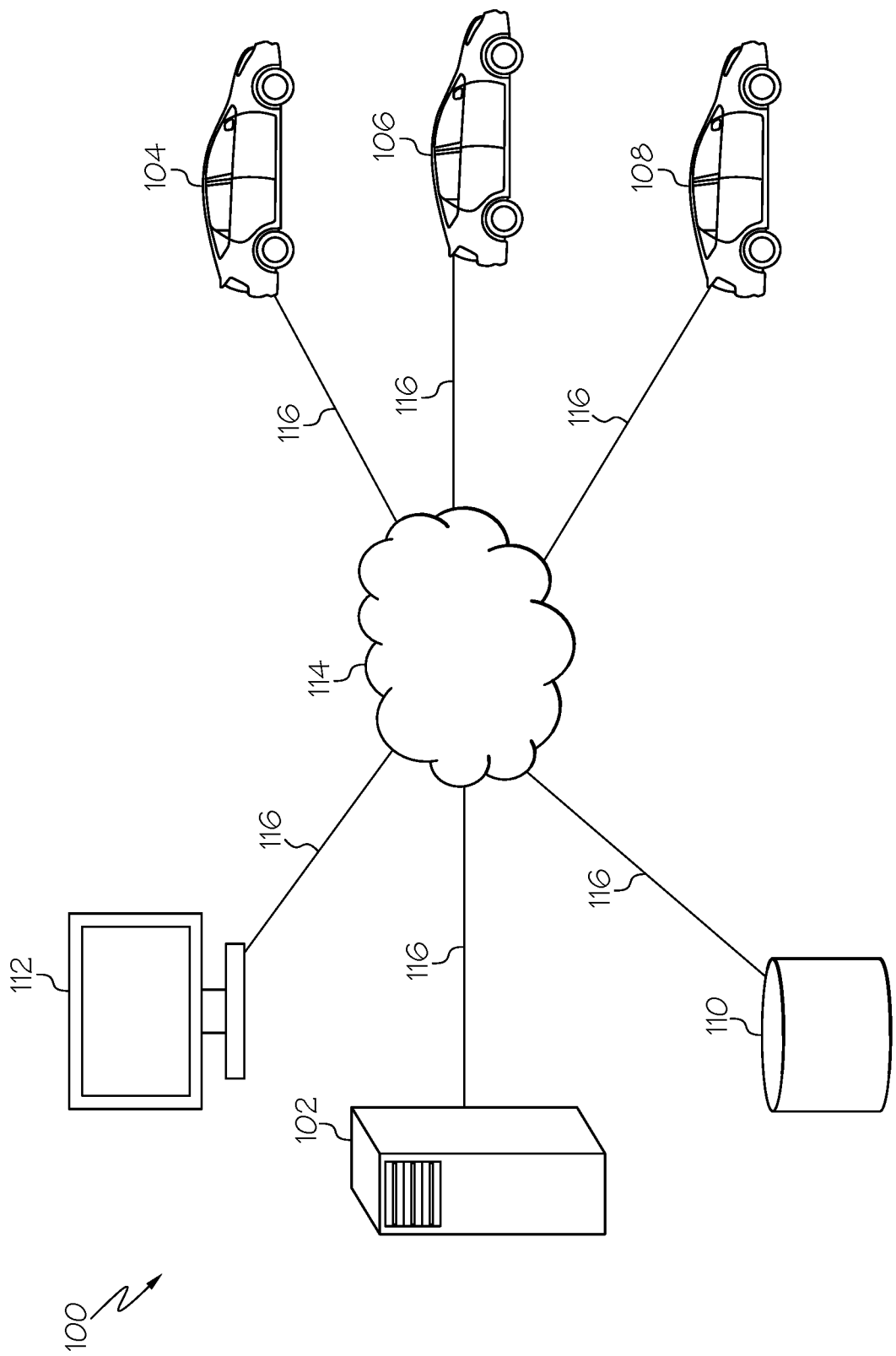
FIG. 1 depicts a prediction system, according to one or more embodiments described and illustrated herein.

FIG. 1 depicts a prediction system, according to one or more embodiments described and illustrated herein. As shown, a system 100 includes a training device 102, vehicles 104, 106, and 108, a database server 110, and a user terminal 112, each of which are communicatively connected via a network 114 and respective communication links 116 to network 114. It should be understood that system 100 could include different and/or additional entities.

Training device 102 could take the form of a mainframe, a workstation, a terminal, a personal computer, a virtual machine, or any combination of these or other training devices configured to carry out the training-device functions described herein. Though system 100 is shown as including a single training device, it should be understood that the system could include multiple training devices.

Vehicle 104 could take the form of an autonomous vehicle, a semi-autonomous vehicle, or a manually-operated vehicle, among other possibilities. The vehicle could include a computing device configured to carry out the vehicle functions or the prediction functions described herein. Either or both of vehicle 106 and 108 could take a form similar to that of vehicle 104.

Database server 110 could take the form of a database management system (DBMS) such as a relational or non-relational DBMS, a server computing device, a cloud-computing device, or any combination of these or other databases, and may be configured to store one or more observed vehicle trajectories, as examples.

User terminal 112 may be any component capable of carrying out the user-terminal functions described herein, and could take the form of (or include) a workstation, a terminal, a personal computer, a tablet device, a smartphone, or any combination of these, as just a few examples. The user terminal may include a user interface configured to output information to a user and/or receive input from the user. In an embodiment, user terminal 12 is configured to present output, received from a computing device (such as training device 102) via the user interface. In a further embodiment, the user terminal is configured to provide input, received via the user interface, to the computing device. The output may be received (and/or the input provided) over network 114 via one or more communication links 116. User terminal 112 may take other forms as well.

Network 114 may include one or more systems and network infrastructure configured to facilitate communication between any one or more of training device 102, vehicles 104, 106, and 108, database server 110, and user terminal 112. The network may take the form of (or include) one or more Wide-Area Networks (WANs), Local-Area Networks (LANs), the Internet, cellular networks, wired networks, wireless networks, or any combination of these or other networks. Network 114 may operate according to one or more communication protocols such as Ethernet, WiFi, IP, TCP, or LTE, as examples. Though the network is shown as a single network, it should be understood that the network may include multiple, distinct networks that are communicatively linked. The network could take other forms as well. Additionally, the communication links may include one or more intermediate paths or systems, for example.

Communication links 116 may communicatively link respective entities with network 114 to facilitate communication between entities communicatively connected to the network, and could take the form of one or more wired and/or wireless communication links. Any of communication links 116 may be a combination of hardware and/or software, perhaps operating on one or more communication-link layers such as one or more physical, network, transport, and/or application layers.

It should be understood that system 100 may include different and/or additional entities. For example, though system 100 is shown as including vehicles 104, 106, and 108, it should be understood that system 100 may include additional or fewer vehicles. Moreover, one or more communication links may be absent, such as one or more communication links between network 114 and vehicles 104, 106, and 108. In some embodiments, database server 110 and/or user terminal 112 are absent, or the functions of one or both of these entities are combined into another device. Other variations are possible as well.

Figure 2:
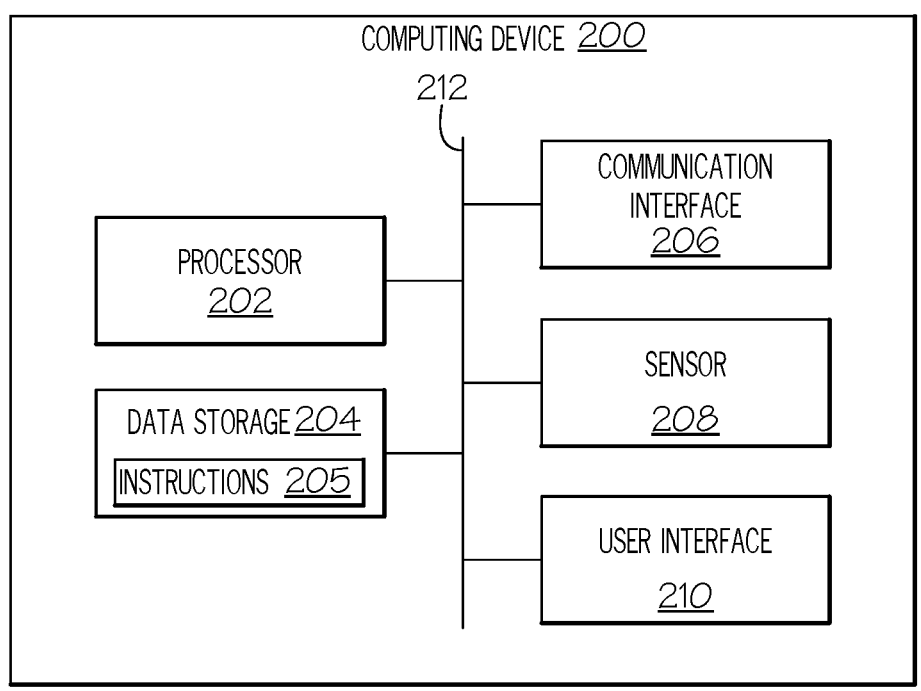
FIG. 2 depicts a block diagram of a computing device, according to one or more embodiments described and illustrated herein.

FIG. 2 depicts a block diagram of a computing device, according to one or more embodiments described and illustrated herein. As shown, a computing device 200 includes a processor 202, a data storage 204 including instructions 205, a communication interface 206, a sensor 208, and a user interface 210, each of which are communicatively connected via a system bus 212. Training device 102, vehicles 104, 106, or 108, database server 110, user terminal 112, any other entity of system 100, or any combination of these could take the form of (or include) computing device 200. It should be understood that computing device 200 may include different and/or additional components, and some or all of the functions of a given component could instead be carried out by one or more different components. Additionally, computing device 200 could take the form of (or include) a plurality of computing devices, and some or all of the functions of a given component could be carried out by any combination of one or more of the computing devices in the plurality.

Processor 202 may take the form of one or more general-purpose processors and/or one or more special-purpose processors, and may be integrated in whole or in part with data storage 204, communication interface 206, sensor 208, user interface 210, and/or any other component of computing device 200, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause computing device 200 to perform the computing-device functions described herein. Additionally or alternatively, instructions 205 may include script instructions executable by a script interpreter configured to cause processor 202 and computing device 200 to execute the instructions specified in the script instructions. In an embodiment, the instructions include instructions executable by the processor to cause the computing device to execute a neural network. It should be understood that instructions 205 may take other forms as well.

Additional data may be stored in data storage 204, such as observed vehicle trajectories, indicated similarities and/or classifications of observed vehicle trajectories, an intermediate space of intermediate representations of observed vehicle trajectories, and/or network parameters of a neural network, as will be described in further detail below. The additional data such as the could be stored as a table, a flat file, data in a filesystem of the data storage, a heap file, a B+ tree, a hash table, a hash bucket, or any combination of these, as examples.

Communication interface 206 may be any component capable of performing the communication-interface functions described herein, including facilitating wired and/or wireless communication between computing device 200 and another entity (such as an entity of system 100). As such, communication interface 206 could take the form of an Ethernet, Wi-Fi, Bluetooth, and/or USB interface, among many other examples. Communication interface 206 may receive data over network 114 via communication links 116, for instance.

Sensor 208 could take the form of one or more sensors operable to perform any of the sensor functions described herein, including one or more sensors operable to acquire a trajectory of a road agent (such as any one or more of vehicles 104, 106, and 108), for example. The sensor could be positioned on an entity of system 100, including an interior and/or exterior of a vehicle (such as vehicles 104, 106, and/or 108). Though sensor 208 may be referenced in the singular throughout this disclosure, it should be understood that sensor 208 may take the form of (or include) a single sensor or multiple sensors.

The sensor could include a radar sensor, a lidar sensor, a camera, an accelerometer, a speedometer, or any combination of these or other sensors. The radar sensor, lidar sensor, and/or camera may obtain signals (such as electromagnetic radiation) that can be used by computing device 200 to obtain information regarding a road agent and/or other objects in an environment of a vehicle or other entity of system 100. For example, the radar sensor and/or lidar sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of a system entity based on the collected radiation. Additionally or alternatively, the accelerometer and the speedometer may be used to detect an acceleration and a speed of a road agent, respectively. Sensor 208 may take other forms as well.

User interface 210 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 200. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 210 may take numerous other forms as well.

System bus 212 may be any component capable of performing the system-bus functions described herein. In an embodiment, system bus 212 is any component configured to transfer data between processor 202, data storage 204, communication interface 206, sensor 208, user interface 210, and/or any other component of computing device 200. In an embodiment, system bus 212 includes a traditional bus as is known in the art. In other embodiments, system bus 212 includes a serial RS-232 communication link, a USB communication link, and/or an Ethernet communication link, alone or in combination with a traditional computer bus, among numerous other possibilities. In some examples, system bus 212 may be formed from any medium that is capable of transmitting a signal, such as conductive wires, conductive traces, or optical waveguides, among other possibilities. Moreover, system bus 212 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 212 may take various other forms as well.

Figure 3A:
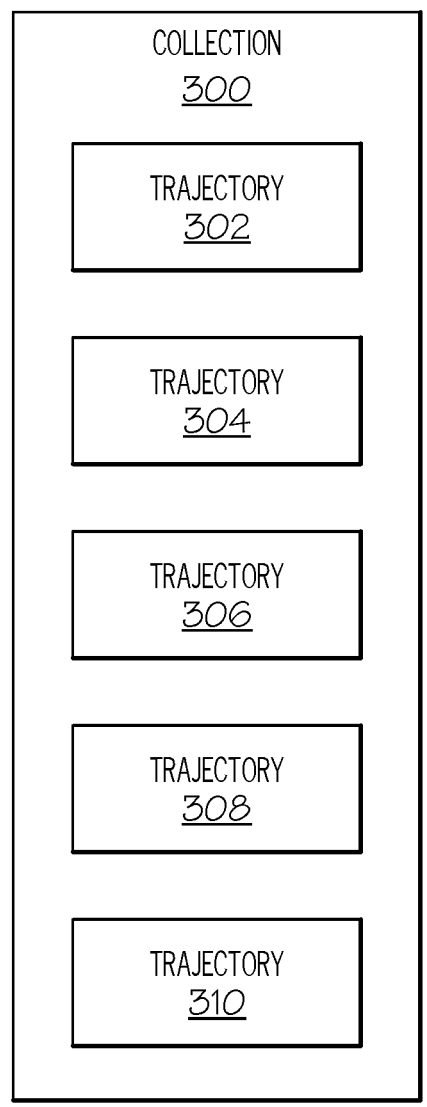
FIG. 3A depicts a collection of observed vehicle trajectories, according to one or more embodiments described and illustrated herein.

FIG. 3A depicts a collection of observed vehicle trajectories, according to one or more embodiments described and illustrated herein. As shown, a collection 300 of observed vehicle trajectories includes trajectories 302, 304, 306, 308, and 310. A trajectory could include, for example, an observed path, direction, angle, speed, or acceleration of a vehicle or road agent, or any combination of these, as just a few examples. A trajectory could include a discrete turn, such as a right turn or left turn, though the trajectory need not take the form of any discrete type of trajectory. The collection may include observed vehicle trajectories of one or more vehicles, such as vehicles 104, 106, 108, or any combination of these or other vehicles. Additionally or alternatively, the trajectories of collection 300 may include trajectories observed by one or more vehicles (such as vehicles 104, 106, 108, or any combination of these or other vehicles). For instance, collection 300 may include trajectories of vehicles 104, 106, and/or another vehicle, as observed by vehicle 108. As another example, collection 300 may include trajectories of vehicle 104 observed by vehicles 106, 108, and/or another vehicle. Other examples are possible as well.

A given observed vehicle trajectory could include video, one or more images, measured g-forces, other data regarding a respective instance of a trajectory taken by a respective vehicle, or a combination of these as examples. The observed vehicle trajectory could be captured by a sensor of a vehicle, such as sensor 208 of vehicle 104 or another vehicle, among other possibilities. The sensor could take the form of a camera, and the trajectory could include video or images captured by the camera. As another possibility, the sensor could take the form of an accelerometer, and the trajectory could include g-forces measured by the accelerometer. Other examples are possible as well, and it should be understood that collection 300 may include different and/or additional trajectories.

Collection 300 could be stored in database server 110, among other possibilities. For instance, any one or more of trajectories 302 to 310 could be initially acquired by vehicle 104 (and/or one or more other vehicles) and stored in data storage 204 of the vehicle. Subsequently, the observed vehicle trajectories could be sent to database server 110 via communication interface 206 of vehicle 104. The trajectories could be sent via a wireless communication link over a network (such as an LTE network), and/or could be sent via a wired communication link such as a USB communication link, among other possibilities. The trajectories may be received by database server 110 (e.g., via communication interface 206 of the database server) and saved to a data storage (such as data storage 204) of the database server.

Figure 3B:
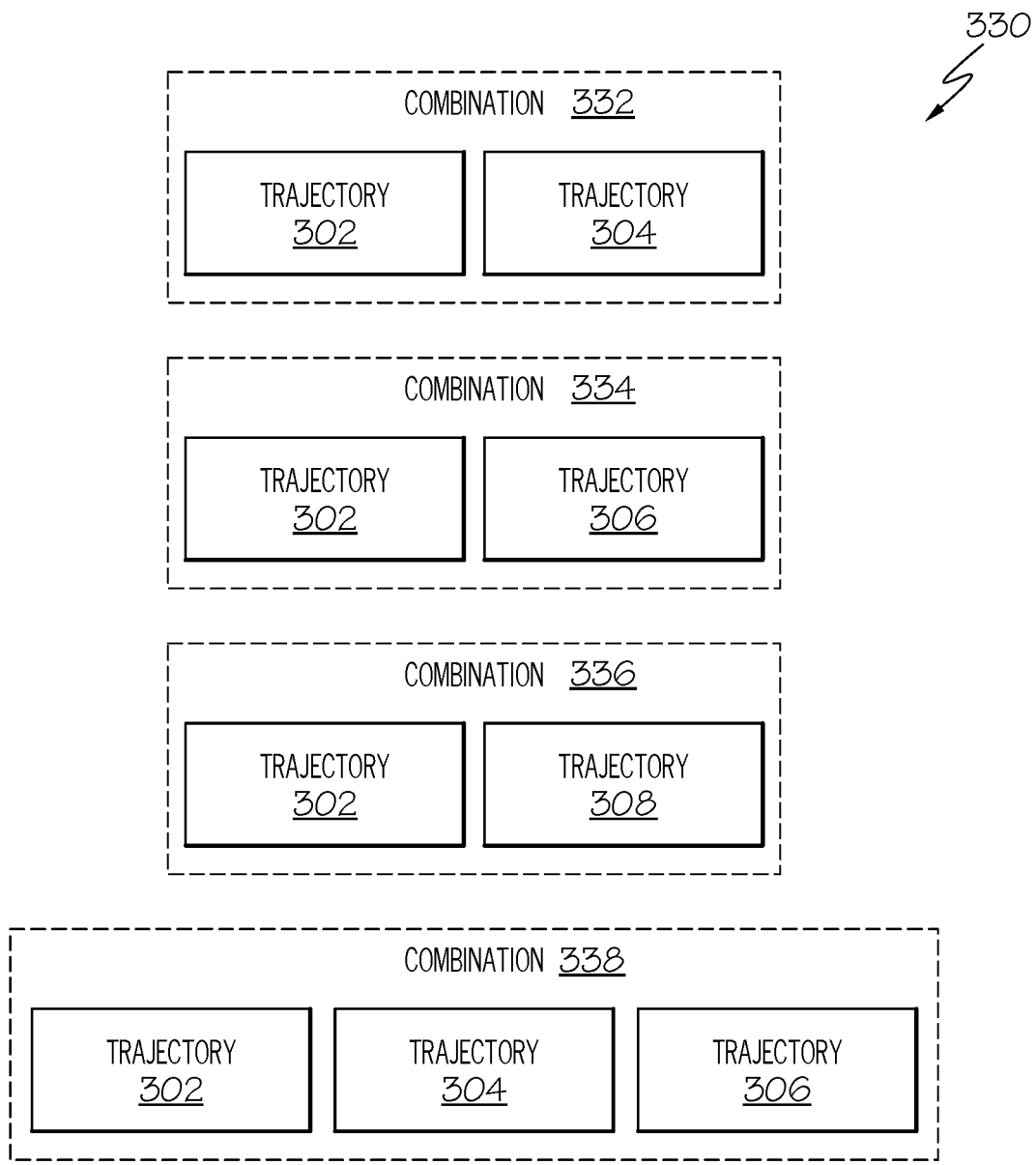
FIG. 3B depicts a plurality of combinations of observed vehicle trajectories, according to one or more embodiments described and illustrated herein.

FIG. 3B depicts a plurality of combinations of observed vehicle trajectories, according to one or more embodiments described and illustrated herein. As shown, a plurality 330 of combination of observed vehicle trajectories includes combinations 332, 334, 336, and 338. Combination 332 includes trajectories 302 and 304, and combination 334 includes trajectories 304 and 306. Combination 336 includes trajectories 302 and 308, and combination 338 includes trajectories 302, 304, and 306. As shown in FIG. 3B, the trajectories in the combinations of observed vehicle trajectories may include trajectories from collection 300, but need not include all on the trajectories in the collection. In some embodiments, the combinations may include additional and/or different trajectories, and the plurality may include different and or additional combinations of observed vehicle trajectories.

Figure 3C:
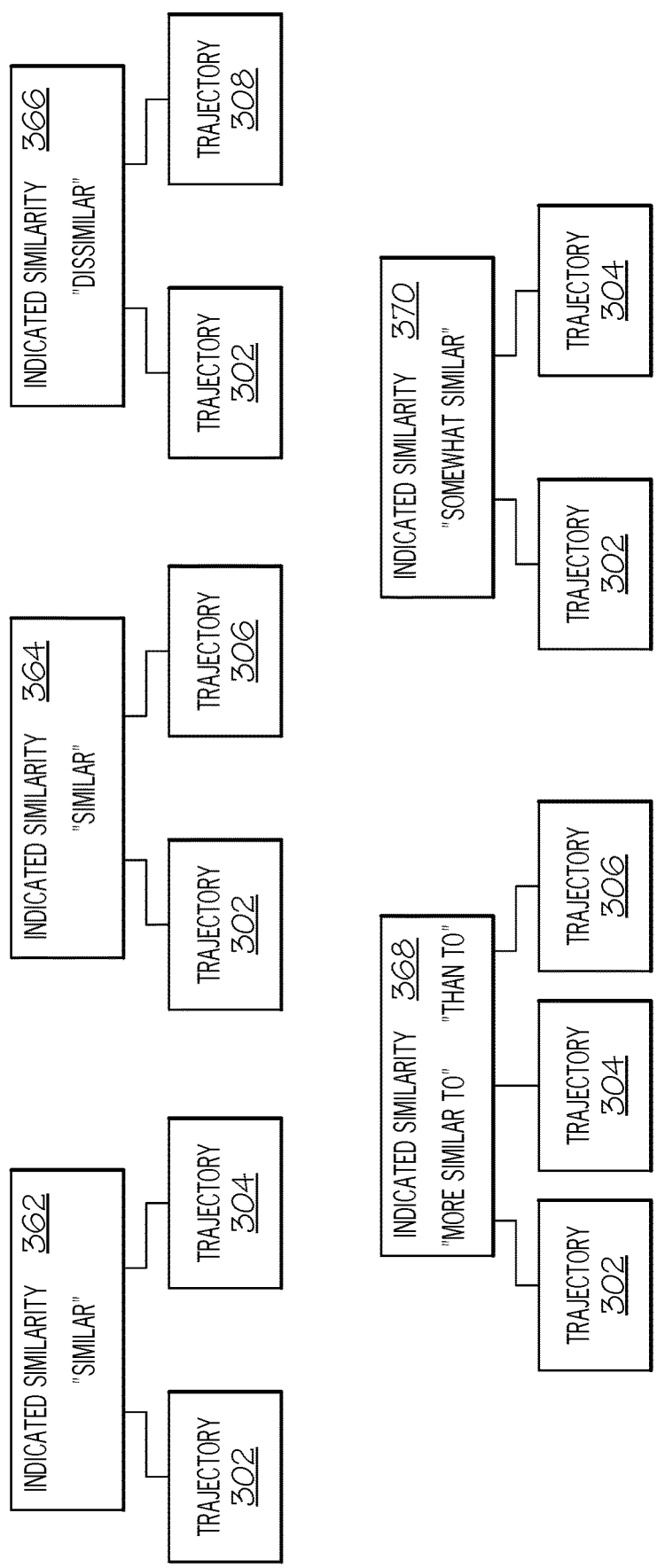
FIG. 3C depicts indicated similarities of trajectories in respective combinations of trajectories of a plurality of observed vehicle trajectories, according to one or more embodiments described and illustrated herein.

FIG. 3C depicts indicated similarities of trajectories in respective combinations of trajectories of the plurality 330 of observed vehicle trajectories, according to one or more embodiments described and illustrated herein. In the illustrated embodiment, indicated similarities 360 include, for each of the plurality 330 of combinations 332, 334, 336, and 338, an indicated similarity 362, 364, 366, and 368 of the trajectories in the combinations, respectively. Also included in indicated similarities 360 is a second indicated similarity 370 of the trajectories in combinations 332—one or more combinations of trajectories of the plurality 330 of combinations could include multiple indicated similarities of the trajectories of the respective combinations.

An indicated similarity could include a true or false indication whether the trajectories in the combination are similar. For example, as shown in FIG. 3C, indicated similarity 362 includes a "similar" indication that trajectories 302 and 304 in a combination are similar. Likewise, indicated similarity includes 364 includes a "similar" indication that trajectories 302 and 306 in combination 334 are similar. In contrast, indicated similarity 366 includes a "dissimilar" indication that trajectories 302 and 308 in combination 336 are not similar.

As a further possibility, an indicated similarity could include an indication whether a first trajectory in the combination is more or less similar to a second trajectory in the combination as compared to a third trajectory in the combination. For example, as shown in FIG. 3C, indicated similarity 368 includes an indication that trajectory 302 is "more similar to" trajectory 304 "than to" trajectory 306. As a further example, a given combination of trajectories among collection 300 could include trajectories 302, 310, and 304, and a given indicated similarity of the trajectories in the combination could include an indication that trajectory 302 is "less similar" to trajectory 310 than to trajectory 304. Other examples are possible as well.

As another possibility, an indicated similarity could include a degree to which the trajectories in the combination are similar. For example, as shown in FIG. 3C, indicated similarity 370 includes a "somewhat similar" indication that trajectories 302 and 304 in combination 332 are similar. Other examples of the degree of similarity include "very similar," "somewhat dissimilar," and "very dissimilar," among others. The degree of similarity could take the form of a number between zero and ten: higher numbers could indicate a relatively higher similarity of the trajectories in the combination, while lower numbers could indicate a relatively lower similarity of the trajectories in the combination. It should be understood that the degree of similarity could take other forms without departing from the scope of the disclosure.

The indicated similarities for combination 332 (or any other combination) need not be consistent. For example, indicated similarity 362 could indicate that trajectories 302 and 304 in combination 332 are "similar," while another indicated similarity obtained by system 100 may indicate that trajectories 302 and 304 are "dissimilar."

Figure 4:
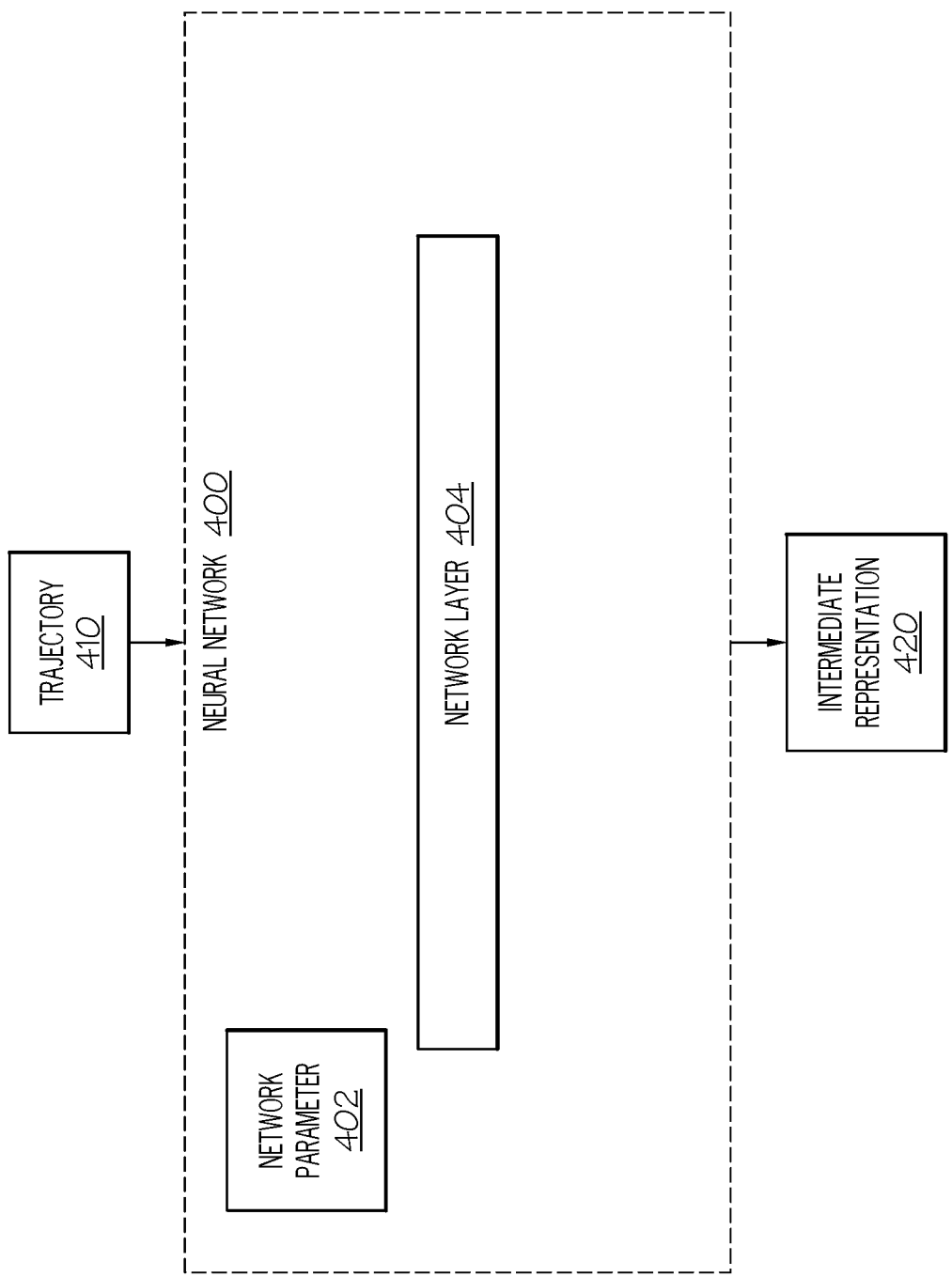
FIG. 4 depicts a neural network, according to one or more embodiments described and illustrated herein.

FIG. 4 depicts a neural network 400, according to one or more embodiments described and illustrated herein. The neural network could take the form of a feedforward neural network, a convolutional neural network, a recurrent neural network, a deep neural network (such as a deep convolutional neural network), or any combination of these or other artificial neural networks capable of carrying out the neural-network functions described herein.

In the embodiment illustrated in FIG. 4, neural network 400 generates an intermediate representation 420 of an observed vehicle trajectory 410. The generated intermediate representation could take the form of one or more values, vectors, or matrices, among other possibilities. The intermediate representations could take the form of respective n-dimensional vectors. Generating intermediate representation 420 may include applying a filter to observed vehicle trajectory 410. The filter could take the form of a kernel, a convolutional matrix, a matrix transformation, or any other filter, as examples, and the generated intermediate representation could take the form of an output of the filter, which could include one or more values, vectors, or matrices, among other possibilities.

As shown in FIG. 4, neural network 400 may include a network parameter 402, and intermediate representation 420 generated by neural network 400 may take the form of (or include) an intermediate representation generated by the neural network based on the network parameter. Additionally or alternatively, neural network 400 may include a network layer 404, and intermediate representation 420 generated by neural network 400 may take the form of (or include) an intermediate representation generated by the network layer of the neural network. In an embodiment, neural network 400 includes a network parameter 402 and a network layer 404, and intermediate representation 420 generated by neural network 400 may take the form of (or include) an intermediate representation generated by the network layer of the neural network based on the network parameter.

In some embodiments, neural network 400 includes one or more additional network layers and/or network parameters. For example, the neural network could include multiple network layers as well as a respective network parameter for each of the network layers.

In an embodiment, neural network 400 includes an additional network layer that generates an intermediate representation of observed vehicle trajectory 410 and provides the generated intermediate representation to network layer 404, which in turn obtains the intermediate representation generated by the additional layer and generates intermediate representation 420 based on the obtained intermediate representation. In another embodiment, neural network 400 includes an additional network layer that obtains intermediate representation 420 generated by network layer 404 and that generates another intermediate representation based on the obtained intermediate representation. In a further embodiment, neural network 400 includes an input layer that receives observed vehicle trajectory 410 and generates an intermediate representation based on the received trajectory. The neural network further includes an output layer that outputs a prediction of the neural network, and one or more hidden layers between the input and outputs layers. The hidden layers obtain an intermediate representation generated by a previous layer (which could be the input layer or another hidden layer) and generate an intermediate representation based on the obtained intermediate representation. The respective intermediate representation generated by the input layer or a hidden layer are provided to a subsequent layer (which could be another hidden layer or the output layer). In an embodiment, the respective intermediate representation generated a given network layer (including any of the input, output, and/or hidden layers) takes the form of (or includes) an intermediate representation generated by the network layer based on a respective network parameter for the network layer. It should be understood that neural network 400 may include a combination of these or other variations of network layers and/or network parameters.

Neural network 400 may be executed by computing device 200 or any combination of computing devices of entities of system 100. For instance, network parameter 402 and/or network layer 404 may be stored in data storage 204 of the computing device, and instructions 205 may include instructions that cause the computing device to execute the neural network.

Figure 5:
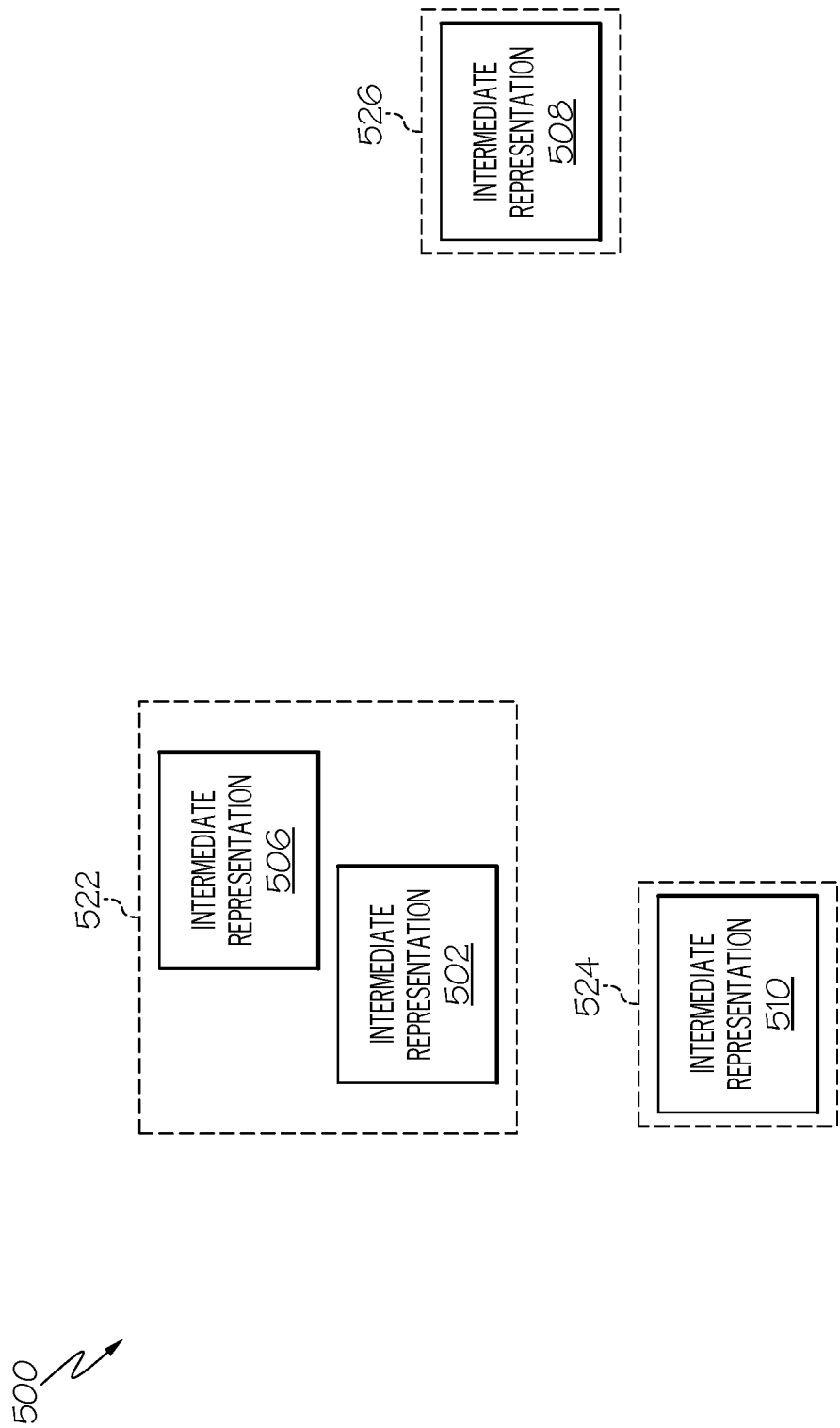
FIG. 5 depicts an intermediate space of intermediate representations generated by neural a network, according to one or more embodiments described and illustrated herein.

FIG. 5 depicts an intermediate space of intermediate representations generated by neural network 400, according to one or more embodiments described and illustrated herein. In the embodiment illustrated in FIG. 5, an intermediate space 500 includes intermediate representations 502, 506, 508, and 510 of trajectories 302, 306, 308, and 310, respectively.

The intermediate could take the form of (or include) an intermediate space having a given number of dimensions, and the intermediate representations of the intermediate space could include intermediate representations having the given number of dimensions. For example, intermediate space 500 could take the form of a two-dimensional intermediate space, as illustrated in FIG. 5, and intermediate representations 502, 506, 508, and 510 could take the form of two-dimensional intermediate representations. It should be understood that the intermediate space could include additional and/or fewer dimensions—for instance, the intermediate space could include dozens or hundreds of dimensions.

Each pair of intermediate representations in intermediate space 500 could include a respective distance between the intermediate representations. In an embodiment, the respective distance between each of the pairs of intermediate representations takes the form of (or includes) a Euclidean distance. For example, the intermediate space could take the form of a three-dimensional space of three-dimensional intermediate representations positioned in the intermediate space, and the respective distances could take the form of distances between the positioned intermediate representations. In the embodiment illustrated in FIG. 5, a distance between intermediate representations 502 and 506 is relatively small, while a distance between intermediate representations 502 and 508 is relatively large.

Intermediate space 500 may include trajectory groups of intermediate representations. For instance, as shown in FIG. 5, intermediate space 500 includes trajectory group 522 having intermediate representations 502 and 506, trajectory group 524 having intermediate representation 510, and trajectory group 526 having intermediate representation 508. The respective trajectory groups could be based on the respective distances between the pairs of intermediate representations in the intermediate space (for example, based on the respective distances between the pairs of intermediate representations in the respective trajectory groups). For example, in the embodiment illustrated in FIG. 5, the distance between intermediate representations 502 and 506 in trajectory group 522 is smaller than each of the distances between intermediate representations 502 and 506 and intermediate representations 510 and 508 in trajectory groups 524 and 526.

In an embodiment, one or more of the respective distances between the pairs of intermediate representations in each of the trajectory groups are smaller than of or more of the respective distances between the intermediate representations in the respective trajectory group and the intermediate representations in the other trajectory groups. In another embodiment, the trajectory groups could take the form of (or include) respective clusters of intermediate representations based on distances between respective pairs of intermediate representations in the intermediate space and/or the respective trajectory groups. For instance, the trajectory groups could take the form of respective clusters according to a k-means or other algorithm.

Figure 6:
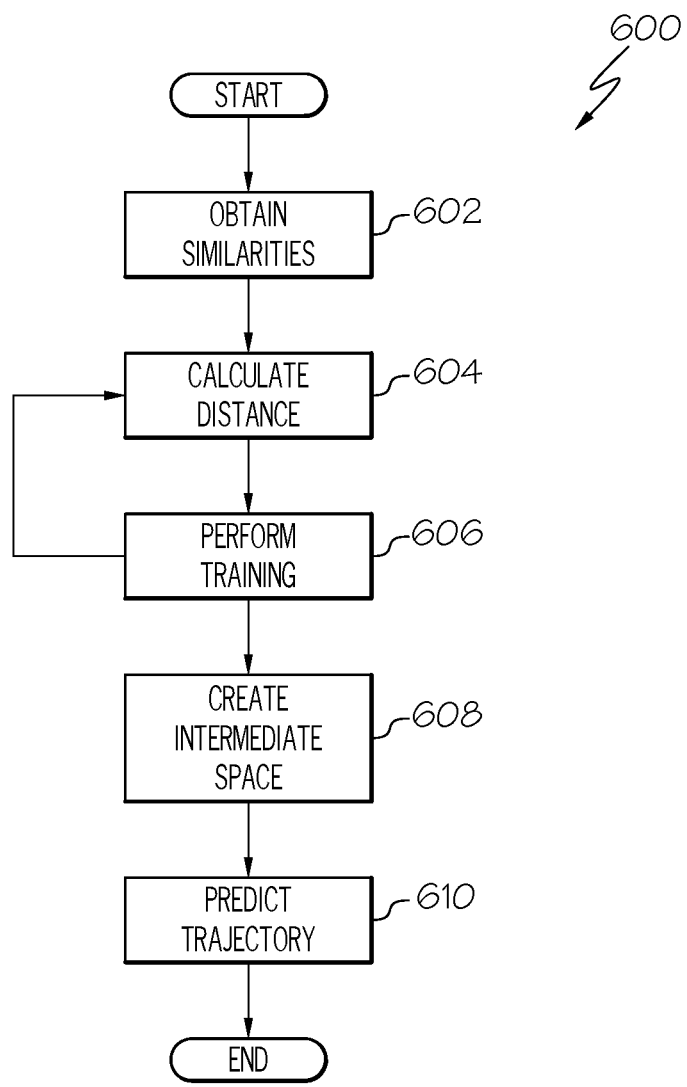
FIG. 6 depicts a flowchart of a method carried out by a prediction system, according to one or more embodiments described and illustrated herein.

FIG. 6 depicts a flowchart of a method carried out by system 100, according to one or more embodiments described and illustrated herein. The method could be carried out by any entity or combination of entities of system 100—e.g., by one or more computing devices of an entity of respective computing devices of a combination of entities. For instance, the method could be carried out by training device 102, vehicle 104 (or another vehicle), or both, as examples. Some aspects could be carried out by training device 102, and other aspects carried out by vehicle 104 (or another vehicle). Additionally or alternatively, the method could be carried out by a computing device. For instance, one or more entities of system 100 (such as training device 102 and/or vehicle 104) could take the form of (or include) respective computing devices, and the method could be carried out by any combination of the respective computing devices. Other examples and variations are possible as well without departing from the scope of the disclosure.

As shown, a method 600 begins at step 602 with system 100 obtaining a respective indicated similarity of trajectories in each of a plurality 330 of combinations of observed vehicle trajectories. For instance, with references to FIGS. 3b and 3c, system 100 may obtain indicated similarities 362, 364, 366, and 368 of the trajectories in combinations 332, 334, 336, and 338 of plurality 330, respectively.

Obtaining indicated similarity 362, for example, could include presenting trajectories 302 and 304 (in combination 332) via a user interface, such as user interface 210 of user terminal 112 or another entity of system 100, and could include obtaining an indicated similarity of the trajectories presented via the user interface. The obtained indicated similarities could be stored in a data storage, such as a data storage of database server 110. The indicated similarities could be obtained by training device 102, for example.

Obtaining indicated similarity 362 could include presenting respective representations of trajectories 302 and 304 in combination 332 via the user interface of user terminal 112. A representation of a given trajectory could include a visual representation, such as a video and/or one or more images of the trajectory. For instance, system 100 may present a video of trajectory 302 as well as a video of trajectory 304. The obtained similarity could indicate that the visual representations are "similar." As a further possibility, a representation of a given trajectory could include a textual representation—for example, a textual description such as "hard right turn" or "soft right turn." For instance, system 100 may present a visual representation of trajectory 302 (such as a video) as well as a textual representation of trajectory 304 (such as "hard right turn"). The obtained similarity of "similar" could indicate that the visual representation is consistent with the textual representation. Obtaining indicated similarity 362 could include obtaining the indicated similarity via the user interface.

The respective representations of trajectories 302 and 304 could be presented, for example, to a user of user terminal 112 via the user interface of the user terminal (e.g., via a touchscreen display or computer monitor), and the user could make a determination or judgement whether the trajectories are similar based on the presented representations. The user could then indicate his or her determination of similarity via the user interface (e.g., via a touchscreen display, computer keyboard, or computer mouse). For instance, presenting the respective representations of trajectories 302 and 304 could include presenting a button on a touchscreen display labeled "Similar" that is associated with an indication that the trajectories are similar, and a button labeled "Dissimilar" that is associated with an indication that the trajectories are dissimilar. The user could indicate his or her judgment of similarity by pressing one of the buttons, and system 100 may obtain indicated similarity 362 via the user interface based on which of the buttons was pressed and the respective indication associated with the pressed button.

Indicated similarities 364, 366, and 368 could be obtained in a manner similar to that for indicated similarity 362. For example, with respect to indicated similarity 368, system 100 could present a visual representation of trajectory 302 (such as a video) and respective textual representations of trajectories 304 and 306 (such as "hard right turn" and "soft right turn"). The obtained similarity of "more similar" could indicate that the visual representation of trajectory 302 is more consistent with the textual description of trajectory 304 than with the textual description of trajectory 306. Other examples are possible as well.

Referring again to FIG. 6, system 100, for each of the combinations in plurality 330, (i) calculates (at step 604) a distance between respective intermediate representations, generated by neural network 400, of the trajectories in the combination, and (ii) performs (at step 606) a training of the neural network based on a calculated loss between the distance calculated at step 604 and the indicated similarity of the trajectories in the combination.

Calculating the distance between respective intermediate representations of the trajectories in a given combination at step 604 may include obtaining the intermediate representations of the trajectories generated by neural network 400, and calculating a distance between the obtained intermediate representations.

FIG. 7A depicts a calculated distance between intermediate representations, according to one or more embodiments described and illustrated herein. As shown, system 100 obtains intermediate representations 702 and 704, generated by neural network 400, of trajectories 302 and 304 in combination 332 of observed vehicle trajectories. System 100 then calculates a distance 710 between obtained intermediate representations 702 and 704. The distance could take the form of the distances described above with reference to FIG. 5, for example. Obtaining the intermediate representations of trajectories 302 and 304 may include providing the trajectories to neural network 400 and obtaining intermediate representations 702 and 704 of the provided trajectories generated by the neural network.

Performing the training of neural network 400 at step 606 may include calculating a loss between the distance calculated at step 604 and the indicated similarity of the trajectories in the combination, and performing the training based on calculated loss.

FIG. 7B depicts a calculated loss, according to one or more embodiments described and illustrated herein. As shown, system 100 calculates a loss 730 between distance 710 calculated at step 604 and indicated similarity 362 of trajectories 302 and 304 in combination 332. The calculated loss may represent a consistency between distance 710 and indicated similarity 362. For instance, the calculated loss may be relatively lower if distance 710 between intermediate representations 702 and 704 is relatively low and if indicated similarity 362 indicates that trajectories 302 and 304 are relatively similar. Conversely, calculated loss 730 may be relatively higher if distance 710 between intermediate representations 702 and 704 is relatively high, but indicated similarity 362 indicates that trajectories 302 and 304 are relatively similar. Additionally, calculated loss 730 may be relatively higher if distance 710 between intermediate representations 702 and 704 is relatively low, but indicated similarity 362 indicates that trajectories 302 and 304 are relatively dissimilar.

In an embodiment, performing the respective training of neural network 400 for each of the combinations in plurality 430 includes updating network parameter 402 based on calculated loss 730. In such an embodiment, the respective intermediate representations of the trajectories for a subsequent calculating of the distance between the trajectories of a combination take the form of (or include) intermediate representations generated by neural network 400 based on the updated network parameter.

As noted above, computing system 100 performs steps 604 and 606 for each of the combinations of observed vehicle trajectories in plurality 330. For instance, after calculating the distance between the generated intermediate representations of trajectories 302 and 304 in combination 332, and after performing the training of neural network 400 based on the calculated loss and indicated similarity 362 of trajectories 302 and 304, system 100 may calculate the distance between respective intermediate representations, generated by the neural network, of trajectories 302 and 306 in combination 334. The system may then perform a training of neural network 400 based on a calculated loss between the calculated distance (between the intermediate representations of trajectories 302 and 306) and indicated similarity 364 of trajectories 302 and 306. This process may be repeated for combinations 336 and 338 in plurality 330.

In an embodiment, the respective calculated losses converge after performing respective trainings for the combinations in plurality 330. In one such embodiment, the respective calculated loss of a second training of neural network 400 is smaller than the respective calculated loss of a first training of the neural network prior to the second training. For example, the respective calculated loss of a subsequent training of neural network 400 may be smaller than calculated loss 730.

Returning to FIG. 6, at step 608, system 100 creates an intermediate space of respective intermediate representations, generated by neural network 400 after performing the respective trainings for the combinations (at steps 604 and 606), of observed vehicle trajectories. In an embodiment, the intermediate representations generated by neural network 400 at steps 604 and 608 include intermediate representations generated by the neural network based on network parameter 402. For instance, creating the intermediate space may include creating an intermediate space of respective intermediate representations generated by the neural network based on the updated network parameter.

In the embodiment illustrated in FIG. 5, system 100 creates intermediate space 500 after performing the respective trainings for the combinations. The created intermediate space may include intermediate representations of observed vehicle trajectories in one or more of plurality 330 of observed vehicle trajectories. For example, as shown, intermediate space 500 includes intermediate representations 502, 506, and 508, which take the form of intermediate representations of trajectories 302, 304, and 308 of one or more of the plurality 330 of combinations of observed vehicle trajectories. However, the intermediate space need not include intermediate representations of the observed vehicle trajectories in all of the plurality of combinations. For example, combinations 332 and 338 of observed vehicle trajectories include trajectory 304, but intermediate space 500 does not include an intermediate representation of this trajectory. Additionally, the intermediate space may include intermediate representations of observed vehicle trajectories that are not in any of the plurality 330 of combinations of observed vehicle trajectories. For instance, intermediate space 500 includes intermediate representation 510 of trajectory 310, which is not in any of the plurality 330 of combinations.

At step 610, system 100 predicts a trajectory of a road agent based on a distance between a given intermediate representation in intermediate space 500 created at step 608 and an intermediate representation of an observed trajectory of the road agent generated by neural network 500. Predicting the trajectory of the road agent could include predicting a future trajectory of the road agent and/or classifying the observed trajectory of the road agent, as examples. The road agent could take the form of a vehicle, a pedestrian, or any other road agent, and system 100 predicting the trajectory of the road agent could include vehicle 104 (or another vehicle) of system 100 predicting the trajectory of the road agent, as examples.

Figure 8:
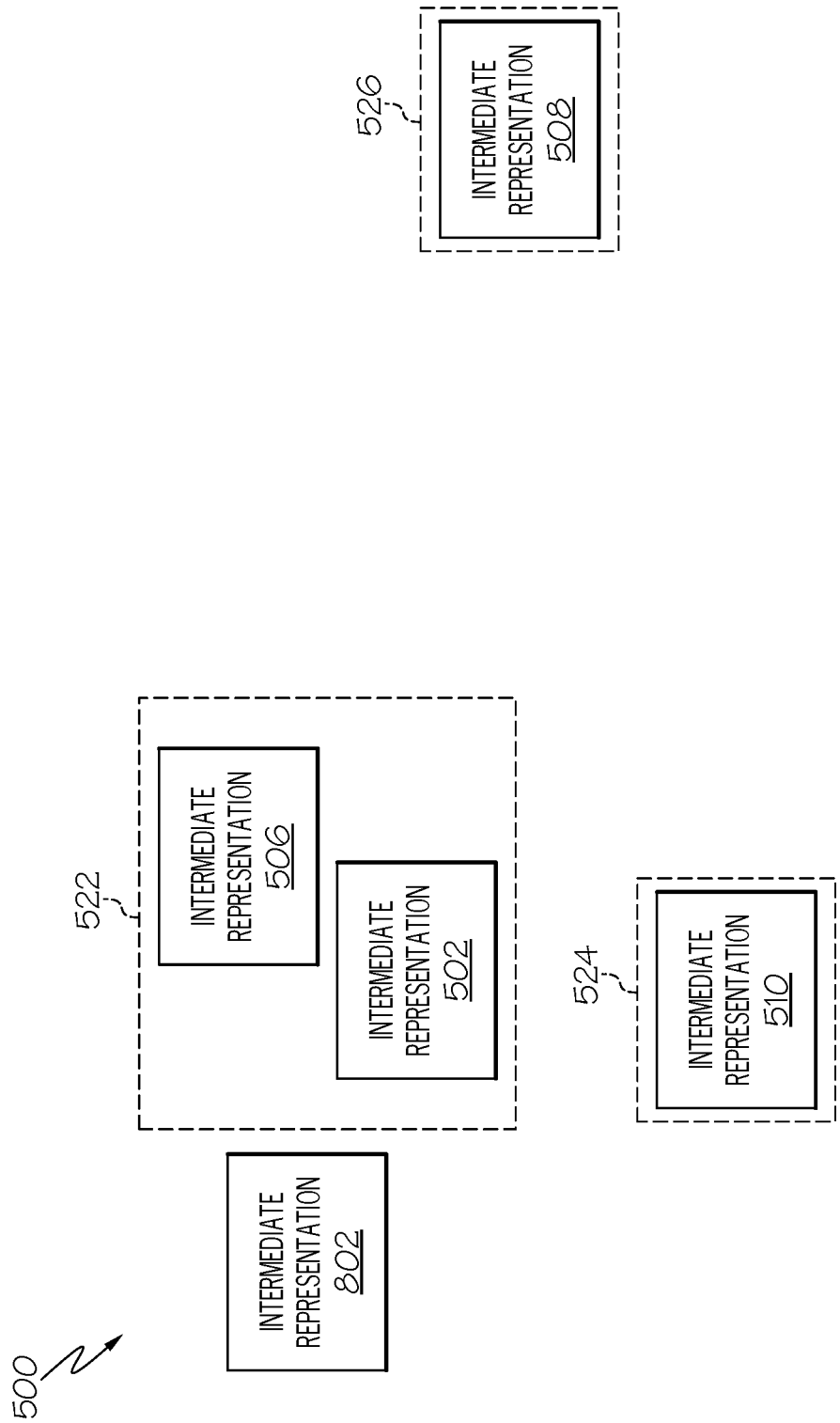
FIG. 8 depicts distances between an intermediate representation of an observed trajectory of a road agent and intermediate representations in an intermediate space, according to one or more embodiments described and illustrated herein.

FIG. 8 depicts distances between intermediate representations in an intermediate space and an intermediate representation of an observed trajectory of a road agent, according to one or more embodiments described and illustrated herein. In the embodiment illustrated in FIG. 8, system 100 predicts a trajectory of a road agent based on a distance between one or more of intermediate representations 502, 506, 508, and 510 in intermediate space 500, and an intermediate representation 802, generated by neural network 400, of an observed trajectory of a road agent. As shown, of the distances between intermediate representation 802 and the intermediate representations of intermediate space 500, the distance between intermediate representation 802 and intermediate representation 502 is the smallest. The distance between intermediate representation 802 and intermediate representation 506 is also relatively small, though not as small as the distance between intermediate representations 802 and 502. Conversely, the distance between intermediate representation 802 and intermediate representation 508 is the largest of the distances between intermediate representation 802 and the intermediate representations of the intermediate space. The distance between intermediate representation 802 and intermediate representation 510 is also relatively large, though not as large as the distance between intermediate representations 802 and 508.

In an embodiment, predicting the trajectory of the road agent based on the distance between a given intermediate representation in intermediate space 500 and intermediate representation 802 includes predicting the trajectory based on a classification of the trajectory for the given intermediate representation. For instance, trajectory 302 for intermediate representation 502 could include a given classification of the trajectory, and predicting a trajectory of the road agent based on a distance between intermediate representations 802 and 502 could include predicting the trajectory based on the given classification. In another embodiment, predicting the trajectory of the road agent based on the distance between a given intermediate representation in the intermediate space and intermediate representation 802 includes predicting the trajectory based on a classification of a second trajectory for a second intermediate representation in a trajectory group (of the intermediate space) that also includes the given intermediate representation. For example, predicting a trajectory of the road agent based on a distance between intermediate representations 802 and 502 could include predicting the trajectory based on a given classification of trajectory 306 for intermediate representation 506 in trajectory group 522 that also includes intermediate representation 502. The classification of a trajectory could take the form of a property of the trajectory—for example, a property obtained via a user interface and/or determined by system 100.

In an embodiment, the distance between intermediate representation 802 and the given intermediate representation in intermediate space 500 is the smallest of the distances between intermediate representation 802 and the respective intermediate representations of intermediate space 700. For instance, predicting the trajectory of the road agent based on the distance between a given intermediate representation in intermediate space 500 and intermediate representation 802 may include calculating the distances between intermediate representation 802 and the intermediate representations in the intermediate space, and predicting the trajectory based on a classification of the trajectory for the given intermediate representation having the smallest calculated distance to intermediate representation 802. Additionally or alternatively, predicting the trajectory of the road agent could include calculating the distances between intermediate representation 802 and the intermediate representations in the intermediate space, and predicting the trajectory based on a given classification for a trajectory for an intermediate representation in a trajectory group that also includes the given intermediate representation having the smallest calculated distance to intermediate representation 802. Other examples are possible as well.

System 100 predicting the trajectory of the road agent could include vehicle 104 (or another vehicle or entity of system 100) observing a trajectory of the road agent, obtaining intermediate representation 802 of the observed trajectory generated by neural network 400 deployed to vehicle 104, and predicting the trajectory based on a distance between intermediate representation 802 and a given intermediate representation in intermediate space 500 deployed to vehicle 104. Observing the trajectory of the road agent could include vehicle 104 capturing the observed trajectory of the road agent via a sensor (such as sensor 208) of the vehicle, as described above with reference to FIG. 3A, among other possibilities. The observed trajectory could be captured and the trajectory of the road agent predicted while vehicle 104 is traveling on a road, as an example. The predicted trajectory of the road agent could include a path, direction, angle, speed, or acceleration of the road agent, or any combination of these, as just a few examples.

In an embodiment, steps 602 to 608 of method 600 are performed by a first entity of system 100, such as training device 102, and step 610 is performed by a different entity of system 100, such as vehicle 104, 106, and/or 108. For instance, training device 102 may obtain indicated similarities 360 at step 602, calculate the distances and perform the trainings of neural network 400 at steps 604 and 606, and create intermediate space 500 at step 608. The neural network and/or the intermediate space may then be deployed to vehicle 104, which may perform step 610. The deployed neural network may include network parameter 402, instructions for causing the vehicle to execute the neural network, or a combination of these, as examples. The deployed intermediate space could include one or more numbers, vectors, matrices, or any combination of these or other intermediate representations, perhaps stored in a data storage of the vehicle, among other examples.

As one possibility, an embodiment takes the form of a method carried out by training device 102 or another entity of system 100 (e.g., by a computing device of the entity). The method includes the training device obtaining a respective indicated similarity of trajectories in each of plurality 330 of combinations of observed vehicle trajectories. The method further includes the training device, for each of the combinations, (i) calculating a distance between respective intermediate representations, generated by neural network 400, of the trajectories in the combination, and (ii) performing a training of the neural network based on a calculated loss between the calculated distance and the indicated similarity of the trajectories in the combination. The respective calculated losses converge after performing respective trainings for the combinations. The method additionally includes the training device creating intermediate space 500 of respective intermediate representations, generated by neural network 400 after performing the respective trainings for the combinations, of observed vehicle trajectories, and further includes deploying the created intermediate space. Deploying intermediate space 500 could include storing the created intermediate space in a data storage, such as data storage 204 of vehicle 104 and/or another data storage (which could be used to copy the created intermediate space to data storage 204 of vehicle 104, for example). As another possibility, deploying the intermediate space could include sending the intermediate space to vehicle 104 over network 114 via communication links 116 (e.g., wireless communication links). The method could further include training device 102 deploying neural network 400 (e.g., by saving instructions and network parameters for executing the neural network to a data storage and/or sending the instructions and/or network parameters to vehicle 104 over a network via one or more communication links).

As another possibility, an embodiment takes the form of a method carried out by vehicle 104 or another entity of system 100 (e.g., by a computing device of the entity). The method includes predicting a trajectory of a road agent based on a distance between a given intermediate representation in intermediate space 500 and an intermediate representation of an observed trajectory of the road agent generated by neural network 400. Intermediate space 500 includes respective intermediate representations, of observed vehicle trajectories, generated by the neural network after performing respective trainings of the neural network for each of plurality 330 of combinations of observed vehicle trajectories. In an embodiment, the respective trainings of the neural network are performed by training device 102 (different from vehicle 104). In an embodiment, the respective trainings include, for each of the combinations in plurality 330 of combinations, (i) a calculated a distance between respective intermediate representations, generated by neural network 400, for the trajectories in the combination, and (ii) a training of neural network 400 based on a calculated loss between the calculated distance and an indicated similarity of the trajectories in the combination, such that respective calculated losses converge after respective trainings for the combinations.

As described above, predicting the trajectory of the road agent based on the distance between a given intermediate representation in intermediate space 500 and intermediate representation 802 may include predicting the trajectory based on a classification of the trajectory for the given intermediate representation. In turn, predicting the trajectory of the road agent based on the classification of the observed vehicle trajectory for the given intermediate representation could include system 100 determining a classification of the observed vehicle trajectory. The determined classification could be a classification among a defined set of classifications, and/or could be a classification that is not among a defined set of classifications. Additionally or alternatively, predicting the trajectory based on the classification could include obtaining a set of respective indicated classifications for observed vehicle trajectories from among a set of defined classifications. The set of indicated classifications could include the classification of the observed vehicle trajectory for the given intermediate representation. The defined set of classifications could include, for example, classifications such as "right turn," "left turn," and "straight ahead," among other possibilities.

The obtained indicated classifications could include classifications from among a set of defined classifications (e.g., as described above). For instance, obtaining the indicated classification of a trajectory could include presenting candidate classifications of the trajectory via the user interface and obtaining an indicated classification selected from the presented candidate classifications via the user interface (e.g., by a user). The presented candidate classifications could include classifications from among the set of defined classifications. In some embodiments, obtaining the indicated classification of a respective trajectory includes receiving a plurality of indicated classifications of the respective trajectory (e.g., received via the user interface) and obtaining an indicated classification that is based on the plurality of received indicated classifications.

In some embodiments, obtaining the indicated classifications includes obtaining an initial set of indicated classifications from among a first set of defined classifications, and later obtaining a subsequent set of indicated classifications from among a second set of defined classifications different from the first set of classifications. In an example, a defined set of classifications initially includes "left turn," "right turn," and "straight ahead." System 100 obtains, for one or more observed vehicle trajectories, an initial set of respective indicated classifications from among the first set of defined classifications. Subsequently, a second set of defined classifications is created by adding a classification of "hard right turn" to the first set of defined classifications. System 100 obtains, for one or more observed vehicle trajectories, a subsequent set of respective indicated classifications from among the second set of defined classifications.

Obtaining the respective indicated classifications could include training device 102 obtaining the classifications, which may then be deployed to vehicle 104 (or another entity of system 100). The indicated classifications could be obtained prior to, contemporaneously with, and/or subsequent to obtaining indicated similarities 360. For instance, training device 102 may obtain an initial set of indicated classifications that are deployed to vehicle 104, and may later obtain a subsequent set of indicated classifications that are also deployed to vehicle 104 (e.g., subsequent to the deployment of the initial set of indicated classifications). The indicated classifications could be deployed in a manner similar to neural network 400 and/or intermediate space 500, as described above—for example, by saving the indicated classifications to a data storage (which could then be copied to data storage 204 of vehicle 104) and/or by sending the indicated classifications to vehicle 104 over network 114 via communication links 116.

In some embodiments, training device 102 obtains the initial set of indicated classifications as described above, which are then deployed to vehicle 102. Subsequently, the second set of defined classifications is created by adding an additional classification to the first set of defined classifications. Training device 102 obtains the subsequent set of classifications, which are also deployed to vehicle 102.

According to one or more embodiments, even if the defined set of classifications is changed (e.g., by adding classifications to the defined set and/or removing classifications from the defined set), neural network 400 does not need to be retrained for system 100 to predict a trajectory of a road agent. Rather, the distances between intermediate representations (generated by neural network 400) in intermediate space 500 may be based (at least in part) on indicated similarities of the respective trajectories of the generated intermediate representations, and the distances may be generally maintained regardless of any changes to the set of defined classifications (e.g., regardless of whether "hard right turn" is subsequently added to the set of possible classifications).

It should now be understood that embodiments described herein are directed to prediction systems, computing devices, and methods for predicting a trajectory of a road agent based on an intermediate space. In some embodiments, a prediction system obtains a respective indicated similarity of trajectories in each of a plurality of combinations of observed vehicle trajectories. The prediction system, for each of the combinations, calculates a distance between respective intermediate representations, generated by a neural network, of the trajectories in the combination, and performs a training of the neural network based on a calculated loss between the calculated distance and the indicated similarity of the trajectories in the combination. The respective calculated losses converge after performing respective trainings for the combinations. The prediction system creates an intermediate space of respective intermediate representations, generated by the neural network after performing the respective trainings for the combinations, of observed vehicle trajectories, and also predicts a trajectory of a road agent based on a distance between a given intermediate representation in the intermediate space and an intermediate representation of an observed trajectory of the road agent generated by the neural network.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   obtaining a respective indicated similarity of trajectories in each of a plurality of combinations of observed vehicle trajectories;
   for each of the combinations,
      calculating a distance between respective intermediate representations, generated by a neural network, of the trajectories in the combination; and
      performing a training of the neural network based on a calculated loss between the calculated distance and the indicated similarity of the trajectories in the combination, wherein respective calculated losses converge after performing respective trainings for the combinations;

creating an intermediate space of respective intermediate representations, generated by the neural network after performing the respective trainings for the combinations, of observed vehicle trajectories; and predicting a trajectory of a road agent based on a distance between a given intermediate representation in the intermediate space and an intermediate representation of an observed trajectory of the road agent generated by the neural network.

2. The method of claim 1, wherein:
the neural network comprises a network parameter, and
the intermediate representations generated by the neural network comprise intermediate representations generated by the neural network based on the network parameter.

3. The method of claim 2, wherein:
performing the respective training for each of the combinations comprises updating the network parameter based on the respective calculated loss, and
creating the intermediate space of respective intermediate representations generated by the neural network after performing the respective trainings comprises creating an intermediate space of respective intermediate representations generated by the neural network based on the updated network parameter.

4. The method of claim 1, wherein:
the intermediate space comprises an intermediate space having a given number of dimensions, and
the intermediate representations of the intermediate space comprise respective intermediate representations having the given number of dimensions.

5. The method of claim 1, wherein each pair of intermediate representations in the intermediate space comprises a respective distance between the intermediate representations.

6. The method of claim 5, wherein the respective distance between the intermediate representations of each of the pairs comprises a Euclidean distance.

7. The method of claim 5, wherein creating the intermediate space comprises creating an intermediate space of respective trajectory groups of intermediate representations based on the respective distances between the pairs of intermediate representations in the intermediate space.

8. The method of claim 1, wherein the predicted trajectory of the road agent comprises one or more of a path of the road agent, a direction of the road agent, an angle of the road agent, a speed of the road agent, and an acceleration of the road agent.

9. The method of claim 1, wherein the respective calculated loss of a second training of the neural network is smaller than the respective calculated loss of a first training of the neural network prior to the second training.

10. The method of claim 1, wherein predicting the trajectory of the road agent comprises predicting a future trajectory of the road agent.

11. The method of claim 1, wherein predicting the trajectory of the road agent based on the distance between the given intermediate representation in the intermediate space and the intermediate representation of the observed trajectory of the road agent comprises predicting the trajectory of the road agent based on a classification of the observed vehicle trajectory for the given intermediate representation.

12. The method of claim 11, further comprising:
obtaining a set of respective indicated classifications for observed vehicle trajectories from among a set of defined classifications,
wherein the set of indicated classifications includes the classification of the observed vehicle trajectory for the given intermediate representation.

13. The method of claim 11, wherein predicting the trajectory of the road agent based on the classification of the observed vehicle trajectory for the given intermediate representation comprises predicting the trajectory based on a classification of a second trajectory for a second intermediate representation in a trajectory group of the intermediate space that also includes the given intermediate representation.

14. A computing device comprising:
a processor; and
a non-transitory computer-readable storage medium comprising instructions that, when executed by the processor, cause the computing device to:
obtain a respective indicated similarity of trajectories in each of a plurality of combinations of observed vehicle trajectories;
for each of the combinations,
calculate a distance between respective intermediate representations, generated by a neural network, of the trajectories in the combination; and
perform a training of the neural network based on a calculated loss between the calculated distance and the indicated similarity of the trajectories in the combination,
wherein respective calculated losses converge after performing respective trainings for the combinations;
create an intermediate space of respective intermediate representations, generated by the neural network after performing the respective trainings for the combinations, of observed vehicle trajectories; and
predict a trajectory of a road agent based on a distance between a given intermediate representation in the intermediate space and an intermediate representation of an observed trajectory of the road agent generated by the neural network.

15. The computing device of claim 14, wherein:
the neural network comprises a network parameter,
the intermediate representations generated by the neural network comprise intermediate representations generated by the neural network based on the network parameter,
the instructions that cause the computing device to perform the respective training for each of the combinations comprise instructions that cause the computing device to update the network parameter based on the respective calculated loss, and
the instructions that cause the computing device to create the intermediate space of respective intermediate representations generated by the neural network after performing the respective trainings comprise instructions that cause the computing device to create an intermediate space of respective intermediate representations generated by the neural network based on the updated network parameter.

16. The computing device of claim 14, wherein the instructions that cause the computing device to predict the trajectory of the road agent based on the distance between the given intermediate representation in the intermediate space and the intermediate representation of the observed trajectory of the road agent comprise instructions that cause the computing device to predict the trajectory of the road agent based on a classification of the observed vehicle trajectory for the given intermediate representation.

17. The computing device of claim 16, wherein:
the instructions further cause the computing device to obtain a set of respective indicated classifications for observed vehicle trajectories from among a set of defined classifications,
the set of indicated classifications includes the classification of the observed vehicle trajectory for the given intermediate representation, and
the instructions that cause the computing device to predict the trajectory of the road agent based on the classification of the observed vehicle trajectory for the given intermediate representation comprise instructions that cause the computing device to predict the trajectory based on a classification of a second trajectory for a second intermediate representation in a trajectory group of the intermediate space that also includes the given intermediate representation.

18. A computing device comprising:
a processor; and
a non-transitory computer-readable storage medium comprising instructions that, when executed by the processor, cause the computing device to:
predict a trajectory of a road agent based on a distance between a given intermediate representation in an intermediate space and an intermediate representation of an observed trajectory of the road agent generated by a neural network,
wherein the intermediate space comprises respective intermediate representations, of observed vehicle trajectories, generated by a neural network after performing respective trainings of the neural network for each of a plurality of combinations of observed vehicle trajectories, and
wherein the respective trainings comprise, for each of the combinations,
a calculated a distance between respective intermediate representations, generated by the neural network, for the trajectories in the combination, and
a training of the neural network based on a calculated loss between the calculated distance and an indicated similarity of the trajectories in the combination, such that respective calculated losses converge after respective trainings for the combinations.

19. The computing device of claim 18, wherein:
each pair of intermediate representations in the intermediate space comprises a respective distance between the intermediate representations, and
the respective distance between the intermediate representations of each of the pairs comprises a Euclidean distance.

20. The computing device of claim 18, wherein the instructions that cause the computing device to predict the trajectory of the road agent based on the distance between the given intermediate representation in the intermediate space and the intermediate representation of the observed trajectory of the road agent comprise instructions that cause the computing device to predict the trajectory of the road agent based on a classification of the observed vehicle trajectory for the given intermediate representation.

* * * * *